(12) United States Patent  (10) Patent No.: US 8,711,493 B2
Chen  (45) Date of Patent: Apr. 29, 2014

(54) IMAGING LENS

(71) Applicant: Genius Electronic Optical Co., Ltd., Taichung (TW)

(72) Inventor: Shihhan Chen, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 13/757,634

(22) Filed: Feb. 1, 2013

(65) Prior Publication Data

US 2014/0092293 A1 Apr. 3, 2014

(30) Foreign Application Priority Data

Sep. 7, 2012 (CN) .......................... 2012 1 0328950

(51) Int. Cl.
*G02B 13/18* (2006.01)
*G02B 9/34* (2006.01)
(52) U.S. Cl.
CPC . *G02B 13/18* (2013.01); *G02B 9/34* (2013.01)
USPC ............................ 359/715; 359/771; 359/780
(58) Field of Classification Search
USPC .................................. 359/713–715, 771–783
See application file for complete search history.

(56) References Cited

U.S. PATENT DOCUMENTS

| | | | |
|---|---|---|---|
| 4,606,607 A | 8/1986 | Kurihara | |
| 5,966,251 A | 10/1999 | Nagahara | |
| 6,043,941 A | 3/2000 | Yamada | |
| 6,476,982 B1 | 11/2002 | Kawakami | |
| 6,728,047 B2 | 4/2004 | Sato | |
| 6,891,683 B2 * | 5/2005 | Schuster | 359/754 |
| 6,917,479 B2 | 7/2005 | Park | |
| 6,950,246 B2 | 9/2005 | Amanai | |
| 6,985,306 B2 | 1/2006 | Abe | |
| 7,012,765 B2 | 3/2006 | Matsui | |
| 7,035,023 B2 | 4/2006 | Nanba | |
| 7,061,694 B2 | 6/2006 | Amanai | |
| 7,274,518 B1 | 9/2007 | Tang | |
| 7,295,386 B2 | 11/2007 | Taniyama | |
| 7,345,830 B2 | 3/2008 | Shinohara | |
| 7,365,920 B2 | 4/2008 | Noda | |
| 7,453,654 B2 | 11/2008 | Shinohara | |
| 7,535,658 B2 | 5/2009 | Taniyama | |
| 7,826,151 B2 | 11/2010 | Tsai | |
| 7,864,454 B1 | 1/2011 | Tang | |
| 8,233,224 B2 | 7/2012 | Chen | |
| 8,310,768 B2 | 11/2012 | Lin | |

(Continued)

FOREIGN PATENT DOCUMENTS

| | | |
|---|---|---|
| JP | 2003-094150 | 10/2004 |
| JP | 2003-168780 | 1/2005 |
| JP | 2003-168781 | 1/2005 |
| JP | 2003-186642 | 1/2005 |
| JP | 2003-402783 | 6/2005 |

*Primary Examiner* — Scott J Sugarman
(74) *Attorney, Agent, or Firm* — Kilpatrick Townsend & Stockton LLP

(57) ABSTRACT

A four element lens system for use with an imaging sensor includes first, second, third, and fourth lens elements and an optical filter that are arranged sequentially in order from an object side to an imaging side. The lens elements are coated with an anti-reflective film. The lens system further includes an optical filter that is disposed at a distance from the imaging sensor. The lens elements are relatively positioned to each other to satisfy specific conditions. The lens elements further include thickness to diameters ratios that satisfy specific conditions.

23 Claims, 5 Drawing Sheets

(56) References Cited

U.S. PATENT DOCUMENTS

| | | |
|---|---|---|
| 8,395,691 B2 | 3/2013 | Tang |
| 8,537,473 B2 * | 9/2013 | Yin ............................. 359/715 |
| 2002/0181121 A1 | 12/2002 | Kawakami |
| 2003/0184883 A1 | 10/2003 | Sato |
| 2005/0030645 A1 | 2/2005 | Do |
| 2006/0056068 A1 | 3/2006 | Lee |
| 2006/0238898 A1 | 10/2006 | Shinohara |
| 2007/0146901 A1 | 6/2007 | Noda |
| 2008/0180817 A1 | 7/2008 | Taniyama |

* cited by examiner

IMAGING LENS

BACKGROUND

The present disclosure relates to an imaging lens and an imaging lens system having the same, more particularly to an imaging lens with four lens elements and to an imaging lens system having the same.

In recent years, various electronic devices have been designed to include imaging lenses and image sensors for image-capturing and video-recording capabilities. To improve portability and imaging performance while reducing dimensions and weights of the electronic devices, different combinations of lenses are installed in electronic devices that have embedded charge coupled device (CCD) sensors or complementary metal oxide semiconductor (CMOS) image sensors. There is thus a need for compact imaging lenses and imaging lens systems that provide improved image quality. Compactness in a lens system is determined by the size of the clear aperture diameters of the lens elements in the lens system. In the description below, the diameter of a lens element is referred to its clear aperture diameter for the sake of brevity.

U.S. Pat. No. 7,453,654 discloses imaging lenses with four lens elements. Each of the imaging lenses has a unique combination and arrangement of lens elements with different shapes to thereby achieve a specific combination of optical characteristics. However, in achieving the specific combination of optical characteristics, certain aspects of optical performance are comprised. Therefore, the need to develop other imaging lenses with better combinations of optical characteristics still exists in the market.

SUMMARY

Certain embodiments of the present invention provide imaging lenses and systems with a desired combination of optical characteristics.

According to an embodiment of the present invention, an imaging lens includes first, second, third, and fourth lens elements arranged sequentially in order from an object side to an imaging side, each of the first, second, third, and fourth lens elements having an object-side surface facing toward the object side, and an imaging-side surface facing toward the imaging side. The imaging lens satisfies the conditions of $vd1-vd2>30$, $0.5<d1avg/d2avg<0.9$, $0.4<d3avg/d4avg<0.7$, wherein $vd1$ and $vd2$ are Abbe numbers of the respective first and second lens elements, and $d1avg$, $d2avg$, $d3avg$, and $d4avg$ are average diameters of the first, second, third, and fourth lens elements.

According to another embodiment of the present invention, an imaging lens system has in order from an object side to an imaging side an aperture stop, a first lens element, a second lens element, a third lens element, and a fourth lens element arranged behind the aperture stop in sequence. Each lens element has an object-side diameter and an imaging-side diameter. The object-side diameter is equal to or smaller than the imaging-side diameter. The aperture stop is configured to pass light and has a circular-shaped opening. The circular-shaped opening has a diameter that is equal to or smaller than the object-side diameter of the first lens element. The first lens element has a first Abbe number and the second lens element has a second Abbe number. The first Abbe number is greater than the second Abbe number by at least 30. The object-side and imaging-side surfaces of each lens element can be coated with an anti-reflective coating.

According to yet another embodiment of the present invention, a lens system includes first, second, third, and fourth lens elements that are arranged in order from an object side to an imaging side. The four lens elements are sequentially arranged on an optical axis. The lens system further includes an optical filter disposed between the fourth lens element and the imaging sensor along the optical axis. Each of the first, second, third, and fourth lens elements has an object-side surface facing toward the object side, and an imaging-side surface facing toward the imaging side. The optical filter has an object-side surface and disposed at a distance of 0.4 mm from the imaging-side of the fourth lens element. In an embodiment, the imaging-side surface of the first lens element and the object-side surface of the second lens element have an air gap of 0.07 mm, the imaging-side surface of the second lens element and the object-side surface of the third lens element have an air gap of 0.34 mm, and the imaging-side surface of the third lens element and the object-side surface of the fourth lens element has an air gap of 0.06 mm. In an embodiment, the first lens element may have a thickness of 0.42 mm, the second lens element may have a thickness of 0.26 mm, the third lens element may have a thickness of 0.435 mm, and the fourth lens element may have a thickness of 0.3 mm. In an embodiment, the optical filter may have a thickness of 0.3 mm and may be disposed at a distance about 0.4 mm of the imaging-side surface of the forth lens element.

The following detailed description together with the accompanying drawings will provide a better understanding of the nature and advantages of the present invention.

DETAILED DESCRIPTION

Figure 1:
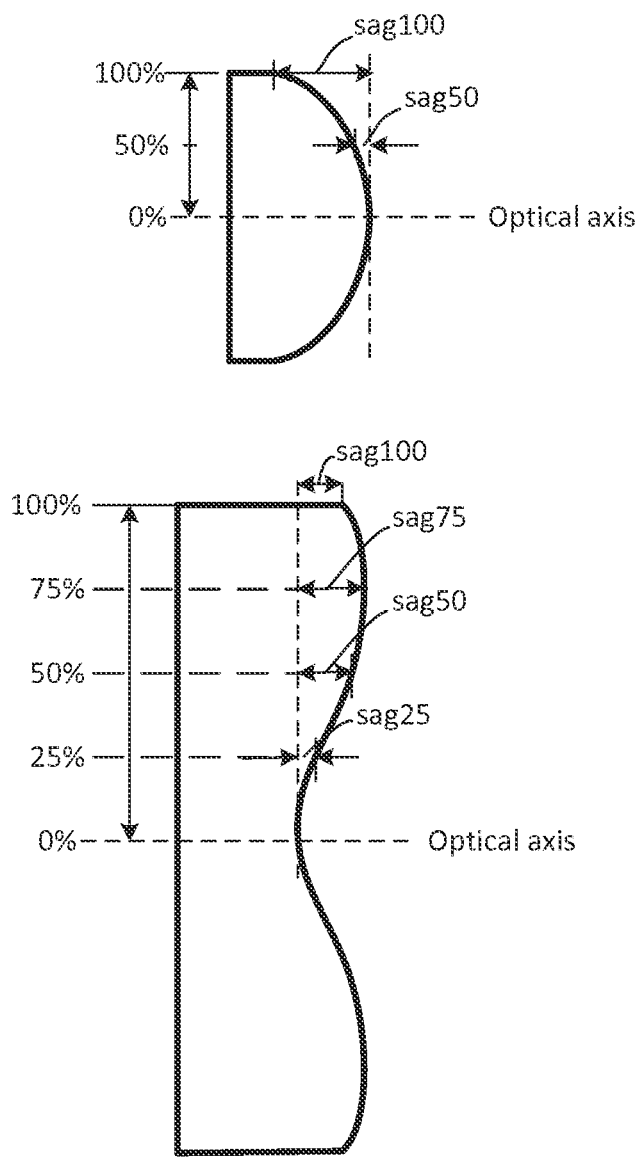
FIG. 1 is a schematic diagram illustrating some terms used in the present description.

The term "lens element" is herein defined as a single transparent mass of refractive material having two opposed refracting surfaces. The term "diameter" is referred to as the "clear aperture" or "clear aperture diameter" of a lens element. The term "clear aperture", "clear aperture diameter", and "diameter" will be alternatively used throughout the specification. The term "total track length" or "TTL" is defined as a distance from an object-side surface of the first lens element to an imaging plane. A "sag" is the displacement of the surface of the lens from a plane transverse (perpendicular) to the optical axis and can be measured at different radial distances from the optical axis. FIG. 1 shows an example of two different lens elements having different sag values at the 25 percent point, 50 percent point, 75 percent point, and at the 100 percent point from the optical axis, where the percentages are relative to the radius of the lens in the perpendicular plane.

Figure 2:
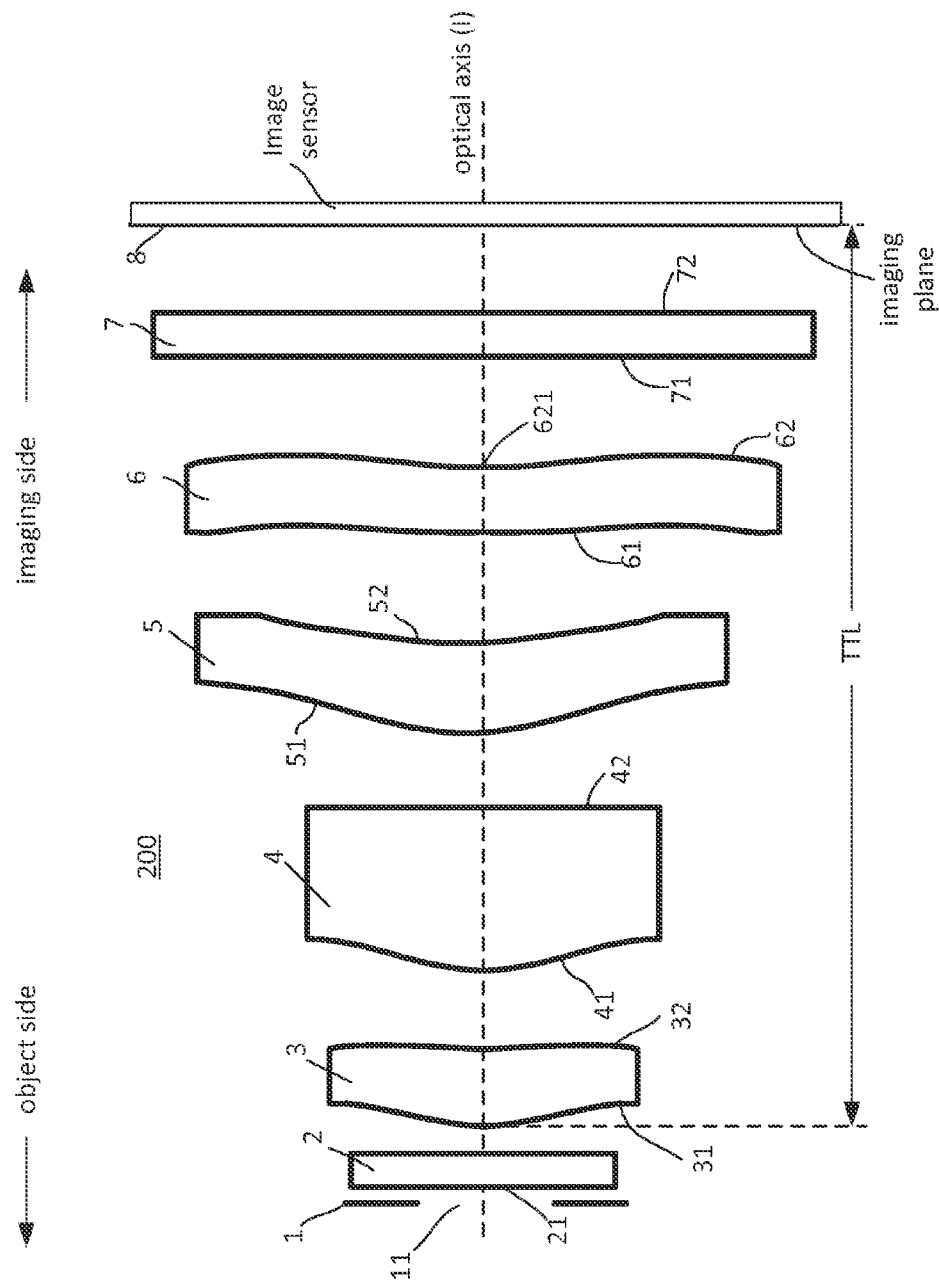
FIG. 2 is a schematic diagram illustrating lens elements, filter, imaging sensor and the optical axis in accordance with an imaging lens system.

Referring to FIG. 2, an imaging lens system 200, according to an embodiment of the present invention, may include a cover glass or window 2, first, second, third, and fourth lens elements 3, 4, 5, 6, and an optical filter 7 arranged in the given order from an object side to an imaging side. Each of the first, second, third, and fourth lens elements 3, 4, 5, 6 has an object-side surface 31, 41, 51, 61, facing toward the object side, and an imaging-side surface 32, 42, 52, 62, facing toward the imaging side. In some embodiments, aperture stop 1 may be disposed at object-side surface 21 of cover glass or window 2. When light from a target object enters imaging lens system 200, it passes through aperture stop 1, cover glass or window 2, lens elements 3 through 6, and optical filter 7 in the given order, and forms an image at an imaging plane 8 which may be a surface of an imaging sensor.

In some embodiments, aperture stop 1 is made of an opaque material. A central opening 11 through aperture stop 1 may be circular shaped and have a diameter that is smaller than the diameter of the object-side surface 31 of the first lens element. In an exemplary embodiment, the diameter of the aperture stop is about 0.91 mm and the diameter of object-side surface 31 of the first lens element is about 1.01 mm. In another embodiment, aperture stop 1 may be disposed between cover glass 2 and object-side surface 31 of the first lens element 3.

Each lens element has two shaped surfaces that converge or diverge light. Each lens element is made out of an optically transparent material, such as glass or plastic. The refractive index of the lens material and curvature of the shaped surface define the light refraction. The surface curvature of each lens element can be defined by a set of sag values. In an embodiment, the set of sag values of each lens element can be provided in a table format to a computer database for manufacturing a lens element.

Referring still to FIG. 2, optical filter 7 has an object-side surface 71 facing toward the object side, and an imaging-side surface 72 facing toward the imaging side. In some embodiments, the optical filter may be an infrared filter that passes light having a wavelength lower than 0.8 microns and suppresses transmission of light having wavelengths greater than 0.8 microns. Each of the four lens elements may have a refractive index greater than 1.5. In some embodiments, the object-side surface and the imaging-side surface of the first, second, third, and fourth lens elements are coated with an anti-reflective coating.

Figure 3:
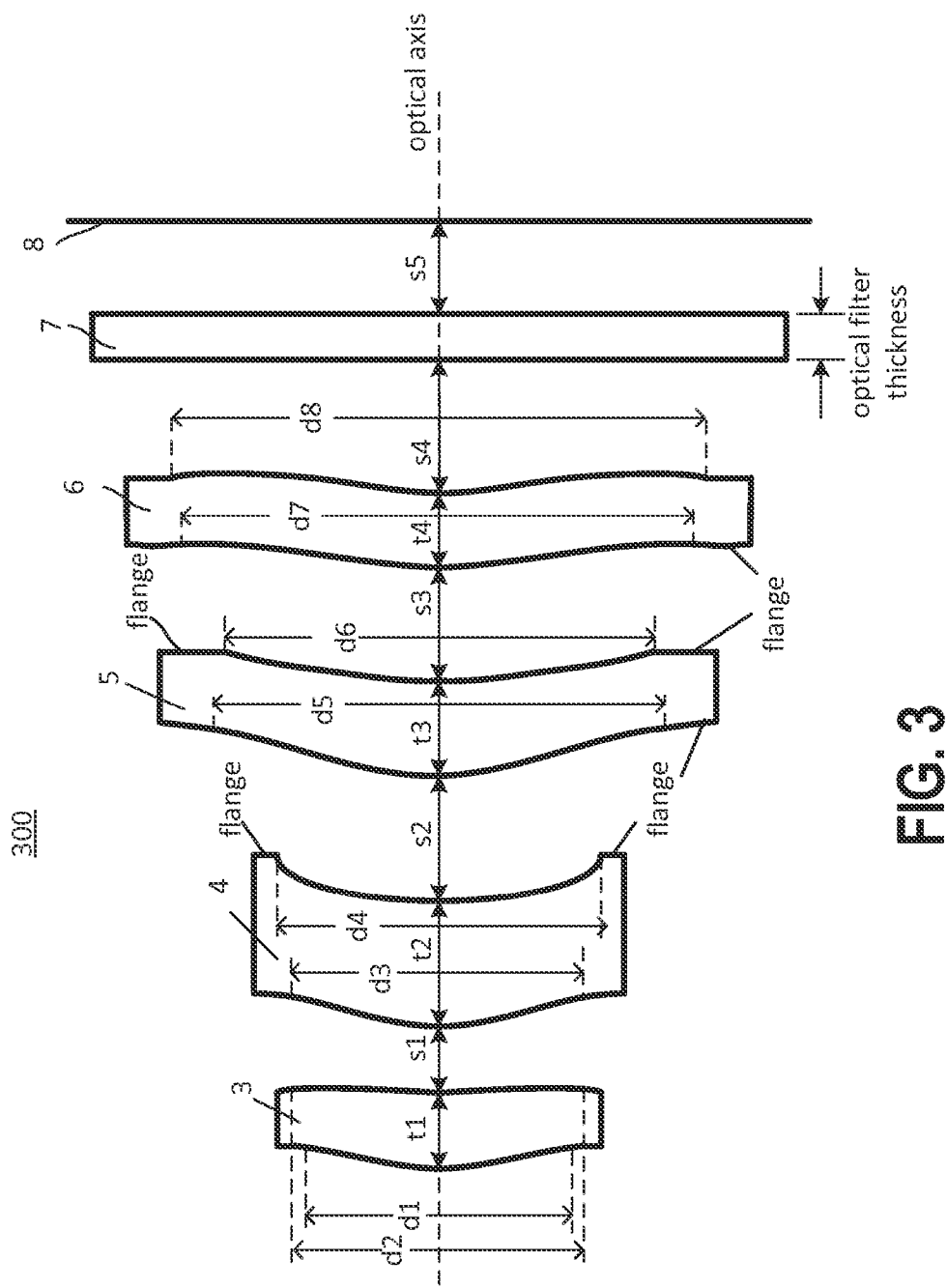
FIG. 3 is a schematic diagram defining the terminology used in an imaging lens system.

In some embodiments, the relative position of the lens elements to each other, the diameter to thickness ratio of each lens element, the ratio between the sum of the air gaps and the total track length are factors in achieving good optical performance. In some embodiments an air gap between the lens elements is needed to facilitate proper focusing of incident light. Referring to FIG. 3, s1 is an air gap between the imaging-side surface of the first lens element and the object-side surface of the second lens element, s2 is an air gap between the imaging-side surface of the second lens element and the object-side surface of the third lens element, s3 is an air gap between the imaging-side surface of the third lens element and the object-side surface of the fourth lens element, and s4 is an air gap between the imaging-side surface of the fourth lens element and the object-side surface of the optical filter. Additionally, imaging plane 8 is placed at a distance s5 from optical filter 7, as shown in FIG. 3. If the imaging plane is placed at a distance larger than 0.4 mm from the optical filter, the imaging sensor may generate an inaccurate image due to possible loss of light with a given chief ray angle (CRA). In an embodiment, the chief ray angle is less than 28 degrees.

Referring still to FIG. 3, t1 is a thickness of first lens element 3 that is measured from the object-side surface at the optical axis to the imaging-side surface at the optical axis. Similarly, t2 is a thickness of second lens element 4 measured at the optical axis, t3 is a thickness of third lens element 5 measured at the optical axis, and t4 is a thickness of fourth lens element 6 measured at the optical axis. Each lens element may have one or more flanges formed around its periphery and extending outwardly away from the optical axis. The flanges may be used to mount the lens element to a lens barrel (not shown). The effective diameter (i.e., the "clear aperture" or "clear aperture diameter") of the object-side surface of first lens element 3 is designated d1, and the effective diameter of the imaging-side surface of first lens element 3 is designated d2. The effective diameter is defined as the diameter of the surface of the lens element that may contribute to the optical performance of the lens element. In other words, the effective diameter may not include the flange at the outer periphery of the lens element. Hereinafter, the effective diameter is referred as the diameter. Similarly, the diameter of the object-side surface of second lens element 4 is designated d3, and the diameter of the imaging-side surface of second lens element 4 is designated d4; the diameter of the object-side surface of third lens element 5 is designated d5, and the diameter of the imaging-side surface of third lens element 5 is designated d6; the diameter of the object-side surface of fourth lens element 6 is designated d7, and the diameter of the imaging-side surface of fourth lens element 6 is designated d8.

Table 1 provides design parameters of a lens system according to an embodiment of the present invention.

TABLE 1

| lens | Refractive index | Thickness (mm) | Air gap (mm) | Diameter (mm) |
|---|---|---|---|---|
| first | 1.54 | t1 = 0.420 | s1 = 0.07 | d1 = 1.011 |
| | | | | d2 = 1.194 |
| second | 1.63 | t2 = 0.26 | s2 = 0.34 | d3 = 1.302 |
| | | | | d4 = 1.336 |
| third | 1.54 | t3 = 0.435 | s3 = 0.06 | d5 = 1.457 |
| | | | | d6 = 1.714 |
| fourth | 1.53 | t4 = 0.3 | s4 = 0.40 | d7 = 2.711 |
| | | | | d8 = 2.903 |

Referring to Table 1 and FIG. 3, the thickness of the lens element is measured from the object-side surface to the imaging-side surface at the optical axis. The air gap is measured from the imaging-side of a lens element to the object-side of an adjacent lens element along the optical axis. In an embodiment, the first lens element 3 has a thickness of 0.42 mm along the optical axis, and the air gap distance (measured at the optical axis) from the imaging-side surface of first lens element 3 to the object-side surface of second lens element 4 is 0.07 mm along the optical axis. The second lens element 4 has a thickness of 0.26 mm along the optical axis. The third lens element 5 has a thickness of 0.435 mm along the optical axis, and the fourth lens element 6 has a thickness of 0.3 mm along the optical axis. In an embodiment, the optical filter is interposed between fourth lens element 6 and imaging sensor 8. The optical filter may have a thickness of about 0.3 mm and disposed at a distance of about 0.4 mm from the imaging-side surface of fourth lens element 6 and at a distance of about 0.3 to 0.4 mm from the imaging sensor.

In an embodiment, the diameter d1 of the object-side surface of first lens element 3 is 1.011 mm. The diameter d2 of the imaging-side surface of first lens element 3 is 1.194 mm. Similarly, the diameter d3 of the object-side surface of second lens element 4 is 1.302 mm and the diameter d4 of the imaging-side surface of second lens element 4 is 1.336 mm. The last 4 rows of Table 1 provide the respective object-side and imaging-side diameters d5, d6, d7, and d8 of third and fourth lens elements. In an embodiment, the thickness of the lens elements has a manufacturing tolerance of less than ±2 to less than ±6 microns depending on the power of the lens. In an embodiment, the tilt of the lens elements is less than ±0.1 degree.

Referring still to FIG. 3, the lens elements are rotationally symmetric about the optical axis. The optical performance of lens system 300 is generally related to the particular object-side and imaging-side surface shapes of the lens elements. These surfaces can be characterized by sag values at various radial distances from the optical axis.

Tables 2 through 5 include sag values of the lens elements 3, 4, 5 and 6, respectively. The sag values are in microns. The "normalized lens Ht" in the first and fourth columns denotes the normalized relative distance of lens element 3 from the optical axis. In other words, 0.0% corresponds to the location at the optical axis, 50.0% and 100.0% correspond to the respective one half and the full radius of lens element 3 in relation to the optical axis. As the lens element is rotationally symmetric about the optical axis, the surface of the lens element is sufficient represented by sag values for the normalized lens height from the optical axis. The sag tables are provided in sufficient detail to be used for the fabrication of the lens elements using a numerically controlled machining tool. The thus obtained lens elements may have a sag tolerance less than ±2 to less than ±6 microns depending on the lens power. It should be noted that, in actual manufacturing, a slope function is used to assure that surface slopes and tolerance variations do not cause step functions in the shape of the lens surface. It should be noted that the tolerance between adjacent sag values may alternate between positive and negative values for not causing steps on the surface of the lens element.

Table 2 contains sag data for fabricating lens element 3. The "Min Sag 3" and the "Max Sag 3" of the second and third columns are the minimum and maximum sag values of the object-side surface of lens element 3. Similarly, the "Min Sag 4" and the "Max Sag 4" of the fifth and sixth columns are the minimum and maximum sag values of the imaging-side surface of lens element 3. In an embodiment, the lens element 3 needs to be within the minimum and maximum sag values to ensure a given optical performance. Sag data in Table 2 is given in mm.

TABLE 2

| Normalized Lens Ht | Min Sag 3 | Max Sag 3 | Normalized Lens Ht | Min Sag 4 | Max Sag 4 |
|---|---|---|---|---|---|
| 0.0% | −0.001000 | 0.001000 | 0.0% | −0.001000 | 0.001000 |
| 2.0% | −0.000969 | 0.001031 | 1.7% | −0.001018 | 0.000982 |
| 3.9% | −0.000875 | 0.001125 | 3.3% | −0.001071 | 0.000929 |
| 5.9% | −0.000718 | 0.001282 | 5.0% | −0.001159 | 0.000841 |
| 7.8% | −0.000499 | 0.001501 | 6.7% | −0.001283 | 0.000717 |
| 9.8% | −0.000217 | 0.001782 | 8.3% | −0.001443 | 0.000556 |
| 11.8% | 0.000127 | 0.002125 | 10.0% | −0.001640 | 0.000360 |
| 13.7% | 0.000533 | 0.002531 | 11.7% | −0.001873 | 0.000127 |
| 15.7% | 0.001000 | 0.002998 | 13.3% | −0.002143 | −0.000144 |
| 17.6% | 0.001530 | 0.003526 | 15.0% | −0.002451 | −0.000452 |
| 19.6% | 0.002120 | 0.004116 | 16.7% | −0.002797 | −0.000798 |
| 21.6% | 0.002771 | 0.004767 | 18.3% | −0.003182 | −0.001184 |
| 23.5% | 0.003483 | 0.005478 | 20.0% | −0.003608 | −0.001610 |
| 25.5% | 0.004255 | 0.006249 | 21.7% | −0.004074 | −0.002077 |
| 27.5% | 0.005087 | 0.007079 | 23.3% | −0.004583 | −0.002585 |
| 29.4% | 0.005978 | 0.007970 | 25.0% | −0.005134 | −0.003137 |
| 31.4% | 0.006928 | 0.008918 | 26.7% | −0.005729 | −0.003733 |
| 33.3% | 0.007936 | 0.009926 | 28.3% | −0.006370 | −0.004374 |
| 35.3% | 0.009002 | 0.010990 | 30.0% | −0.007057 | −0.005063 |
| 37.3% | 0.010126 | 0.012112 | 31.7% | −0.007793 | −0.005799 |
| 39.2% | 0.011305 | 0.013291 | 33.3% | −0.008578 | −0.006585 |
| 41.2% | 0.012540 | 0.014525 | 35.0% | −0.009415 | −0.007423 |
| 43.1% | 0.013830 | 0.015813 | 36.7% | −0.010305 | −0.008313 |
| 45.1% | 0.015174 | 0.017155 | 38.3% | −0.011249 | −0.009259 |
| 47.1% | 0.016570 | 0.018550 | 40.0% | −0.012250 | −0.010261 |
| 49.0% | 0.018017 | 0.019996 | 41.7% | −0.013310 | −0.011321 |
| 51.0% | 0.019515 | 0.021492 | 43.3% | −0.014430 | −0.012443 |
| 52.9% | 0.021060 | 0.023036 | 45.0% | −0.015612 | −0.013627 |
| 54.9% | 0.022653 | 0.024627 | 46.7% | −0.016859 | −0.014876 |
| 56.9% | 0.024290 | 0.026263 | 48.3% | −0.018173 | −0.016191 |
| 58.8% | 0.025969 | 0.027941 | 50.0% | −0.019556 | −0.017576 |
| 60.8% | 0.027689 | 0.029659 | 51.7% | −0.021010 | −0.019032 |
| 62.7% | 0.029446 | 0.031416 | 53.3% | −0.022537 | −0.020561 |
| 64.7% | 0.031239 | 0.033207 | 55.0% | −0.024140 | −0.022166 |
| 66.7% | 0.033064 | 0.035031 | 56.7% | −0.025819 | −0.023848 |
| 68.6% | 0.034917 | 0.036883 | 58.3% | −0.027578 | −0.025610 |
| 70.6% | 0.036796 | 0.038761 | 60.0% | −0.029418 | −0.027453 |
| 72.5% | 0.038696 | 0.040661 | 61.7% | −0.031342 | −0.029379 |
| 74.5% | 0.040614 | 0.042578 | 63.3% | −0.033349 | −0.031390 |
| 76.5% | 0.042546 | 0.044509 | 65.0% | −0.035443 | −0.033487 |
| 78.4% | 0.044485 | 0.046449 | 66.7% | −0.037623 | −0.035671 |
| 80.4% | 0.046428 | 0.048391 | 68.3% | −0.039893 | −0.037944 |
| 82.4% | 0.048368 | 0.050331 | 70.0% | −0.042251 | −0.040306 |
| 84.3% | 0.050298 | 0.052262 | 71.7% | −0.044699 | −0.042759 |
| 86.3% | 0.052211 | 0.054176 | 73.3% | −0.047238 | −0.045302 |
| 88.2% | 0.054099 | 0.056065 | 75.0% | −0.049868 | −0.047936 |
| 90.2% | 0.055951 | 0.057918 | 76.7% | −0.052589 | −0.050661 |
| 92.2% | 0.057757 | 0.059726 | 78.3% | −0.055402 | −0.053479 |
| 94.1% | 0.059502 | 0.061473 | 80.0% | −0.058309 | −0.056391 |

TABLE 2-continued

| Normalized Lens Ht | Min Sag 3 | Max Sag 3 | Normalized Lens Ht | Min Sag 4 | Max Sag 4 |
|---|---|---|---|---|---|
| 96.1% | 0.061171 | 0.063145 | 81.7% | −0.061310 | −0.059398 |
| 98.0% | 0.062744 | 0.064722 | 83.3% | −0.064409 | −0.062502 |
| 100.0% | 0.063612 | 0.065591 | 85.0% | −0.067610 | −0.065708 |
| | | | 86.7% | −0.070918 | −0.069023 |
| | | | 88.3% | −0.074345 | −0.072457 |
| | | | 90.0% | −0.077904 | −0.076024 |
| | | | 91.7% | −0.081617 | −0.079748 |
| | | | 93.3% | −0.085518 | −0.083663 |
| | | | 95.0% | −0.089656 | −0.087818 |
| | | | 96.7% | −0.094106 | −0.092293 |
| | | | 98.3% | −0.098990 | −0.097214 |
| | | | 100.0% | −0.103022 | −0.101288 |

In accordance with Table 2, lens element 3 may have an average sag value of 20 microns (0.020 mm) at 50 point and an average sag value of 65 microns (0.065 mm) at 100 point of the clear aperture of the object-side. The ratio between the sag value at 50 point and at 100 point satisfies the following conditions: 0.2<sag3(50)/sag3(100)<0.6 or preferably 0.25<sag3(50)/sag3(100)<0.50.

Table 3 contains sag data for fabricating lens element 4. The "Min Sag 5" and the "Max Sag 5" of the second and third columns are the minimum and maximum sag values of the object-side surface of lens element 3. Similarly, the "Min Sag 6" and the "Max Sag 6" of the fifth and sixth columns are the minimum and maximum sag values of the imaging-side surface of lens element 4. In an embodiment, the lens element 4 needs to be within the minimum and maximum sag values to ensure a given optical performance. Sag values in Table 3 are given in mm.

TABLE 3

| Normalized Lens Ht | Min Sag 5 | Max Sag 5 | Normalized Lens Ht | Min Sag 6 | Max Sag 6 |
|---|---|---|---|---|---|
| 0.0% | −0.001000 | 0.001000 | 0.0% | −0.001000 | 0.001000 |
| 1.5% | −0.000989 | 0.001011 | 1.5% | −0.000963 | 0.001037 |
| 3.0% | −0.000957 | 0.001043 | 3.0% | −0.000854 | 0.001146 |
| 4.5% | −0.000903 | 0.001097 | 4.5% | −0.000671 | 0.001329 |
| 6.1% | −0.000827 | 0.001173 | 6.0% | −0.000414 | 0.001585 |
| 7.6% | −0.000731 | 0.001269 | 7.5% | −0.000085 | 0.001914 |
| 9.1% | −0.000613 | 0.001387 | 9.0% | 0.000318 | 0.002316 |
| 10.6% | −0.000475 | 0.001525 | 10.4% | 0.000794 | 0.002791 |
| 12.1% | −0.000317 | 0.001683 | 11.9% | 0.001343 | 0.003340 |
| 13.6% | −0.000138 | 0.001861 | 13.4% | 0.001966 | 0.003962 |
| 15.2% | 0.000059 | 0.002059 | 14.9% | 0.002663 | 0.004658 |
| 16.7% | 0.000275 | 0.002275 | 16.4% | 0.003433 | 0.005426 |
| 18.2% | 0.000509 | 0.002508 | 17.9% | 0.004276 | 0.006269 |
| 19.7% | 0.000760 | 0.002759 | 19.4% | 0.005193 | 0.007184 |
| 21.2% | 0.001027 | 0.003026 | 20.9% | 0.006184 | 0.008173 |
| 22.7% | 0.001309 | 0.003308 | 22.4% | 0.007248 | 0.009236 |
| 24.2% | 0.001605 | 0.003604 | 23.9% | 0.008384 | 0.010371 |
| 25.8% | 0.001913 | 0.003912 | 25.4% | 0.009594 | 0.011579 |
| 27.3% | 0.002233 | 0.004232 | 26.9% | 0.010877 | 0.012860 |
| 28.8% | 0.002562 | 0.004561 | 28.4% | 0.012232 | 0.014213 |
| 30.3% | 0.002899 | 0.004898 | 29.9% | 0.013659 | 0.015638 |
| 31.8% | 0.003243 | 0.005242 | 31.3% | 0.015157 | 0.017134 |
| 33.3% | 0.003592 | 0.005590 | 32.8% | 0.016727 | 0.018701 |
| 34.8% | 0.003943 | 0.005942 | 34.3% | 0.018366 | 0.020339 |
| 36.4% | 0.004295 | 0.006294 | 35.8% | 0.020076 | 0.022046 |
| 37.9% | 0.004646 | 0.006645 | 37.3% | 0.021854 | 0.023822 |
| 39.4% | 0.004995 | 0.006994 | 38.8% | 0.023701 | 0.025666 |
| 40.9% | 0.005339 | 0.007337 | 40.3% | 0.025614 | 0.027577 |
| 42.4% | 0.005676 | 0.007675 | 41.8% | 0.027594 | 0.029555 |
| 43.9% | 0.006005 | 0.008004 | 43.3% | 0.029639 | 0.031597 |
| 45.5% | 0.006325 | 0.008324 | 44.8% | 0.031747 | 0.033703 |
| 47.0% | 0.006633 | 0.008632 | 46.3% | 0.033919 | 0.035872 |
| 48.5% | 0.006930 | 0.008929 | 47.8% | 0.036153 | 0.038103 |
| 50.0% | 0.007214 | 0.009213 | 49.3% | 0.038447 | 0.040395 |
| 51.5% | 0.007485 | 0.009485 | 50.7% | 0.040800 | 0.042746 |
| 53.0% | 0.007744 | 0.009743 | 52.2% | 0.043212 | 0.045155 |
| 54.5% | 0.007990 | 0.009990 | 53.7% | 0.045682 | 0.047622 |
| 56.1% | 0.008226 | 0.010226 | 55.2% | 0.048208 | 0.050146 |
| 57.6% | 0.008453 | 0.010452 | 56.7% | 0.050789 | 0.052725 |
| 59.1% | 0.008673 | 0.010673 | 58.2% | 0.053426 | 0.055359 |
| 60.6% | 0.008891 | 0.010890 | 59.7% | 0.056118 | 0.058048 |
| 62.1% | 0.009109 | 0.011109 | 61.2% | 0.058864 | 0.060791 |
| 63.6% | 0.009334 | 0.011333 | 62.7% | 0.061665 | 0.063590 |
| 65.2% | 0.009571 | 0.011570 | 64.2% | 0.064522 | 0.066443 |
| 66.7% | 0.009826 | 0.011826 | 65.7% | 0.067434 | 0.069353 |

TABLE 3-continued

| Normalized Lens Ht | Min Sag 5 | Max Sag 5 | Normalized Lens Ht | Min Sag 6 | Max Sag 6 |
|---|---|---|---|---|---|
| 68.2% | 0.010109 | 0.012108 | 67.2% | 0.070405 | 0.072321 |
| 69.7% | 0.010427 | 0.012426 | 68.7% | 0.073435 | 0.075348 |
| 71.2% | 0.010791 | 0.012790 | 70.1% | 0.076527 | 0.078437 |
| 72.7% | 0.011211 | 0.013209 | 71.6% | 0.079685 | 0.081591 |
| 74.2% | 0.011697 | 0.013695 | 73.1% | 0.082912 | 0.084813 |
| 75.8% | 0.012263 | 0.014259 | 74.6% | 0.086213 | 0.088110 |
| 77.3% | 0.012921 | 0.014916 | 76.1% | 0.089593 | 0.091485 |
| 78.8% | 0.013683 | 0.015677 | 77.6% | 0.093059 | 0.094946 |
| 80.3% | 0.014563 | 0.016554 | 79.1% | 0.096618 | 0.098500 |
| 81.8% | 0.015573 | 0.017562 | 80.6% | 0.100279 | 0.102154 |
| 83.3% | 0.016726 | 0.018711 | 82.1% | 0.104052 | 0.105919 |
| 84.8% | 0.018031 | 0.020013 | 83.6% | 0.107946 | 0.109806 |
| 86.4% | 0.019500 | 0.021476 | 85.1% | 0.111975 | 0.113826 |
| 87.9% | 0.021138 | 0.023109 | 86.6% | 0.116151 | 0.117992 |
| 89.4% | 0.022950 | 0.024915 | 88.1% | 0.120490 | 0.122319 |
| 90.9% | 0.024937 | 0.026895 | 89.6% | 0.125007 | 0.126824 |
| 92.4% | 0.027094 | 0.029046 | 91.0% | 0.129720 | 0.131523 |
| 93.9% | 0.029410 | 0.031356 | 92.5% | 0.134648 | 0.136435 |
| 95.5% | 0.031870 | 0.033809 | 94.0% | 0.139812 | 0.141581 |
| 97.0% | 0.034446 | 0.036380 | 95.5% | 0.145233 | 0.146982 |
| 98.5% | 0.037103 | 0.039035 | 97.0% | 0.150934 | 0.152661 |
| 100.0% | 0.037460 | 0.039391 | 98.5% | 0.156941 | 0.158644 |
| | | | 100.0% | 0.162236 | 0.163918 |

Table 4 contains sag data for fabricating lens element 5. The "Min Sag 7" and the "Max Sag 7" of the second and third columns are the minimum and maximum sag values of the object-side surface of lens element 3. Similarly, the "Min Sag 8" and the "Max Sag 8" of the fifth and sixth columns are the minimum and maximum sag values of the imaging-side surface of lens element 5. In an embodiment, the lens element 5 needs to be within the minimum and maximum sag values to ensure a given optical performance. Sag values in Table 4 are given in mm.

TABLE 4

| Normalized Lens Ht | Min Sag 7 | Max Sag 7 | Normalized Lens Ht | Min Sag 8 | Max Sag 8 |
|---|---|---|---|---|---|
| 0.0% | −0.001500 | 0.001500 | 0.0% | −0.001500 | 0.001500 |
| 1.4% | −0.001534 | 0.001466 | 1.2% | −0.001592 | 0.001407 |
| 2.7% | −0.001634 | 0.001365 | 2.3% | −0.001869 | 0.001129 |
| 4.1% | −0.001802 | 0.001197 | 3.5% | −0.002329 | 0.000667 |
| 5.5% | −0.002036 | 0.000963 | 4.7% | −0.002971 | 0.000020 |
| 6.8% | −0.002337 | 0.000661 | 5.8% | −0.003795 | −0.000808 |
| 8.2% | −0.002704 | 0.000294 | 7.0% | −0.004799 | −0.001817 |
| 9.6% | −0.003135 | −0.000139 | 8.1% | −0.005980 | −0.003004 |
| 11.0% | −0.003632 | −0.000636 | 9.3% | −0.007335 | −0.004366 |
| 12.3% | −0.004192 | −0.001197 | 10.5% | −0.008863 | −0.005902 |
| 13.7% | −0.004815 | −0.001821 | 11.6% | −0.010561 | −0.007607 |
| 15.1% | −0.005500 | −0.002508 | 12.8% | −0.012424 | −0.009479 |
| 16.4% | −0.006246 | −0.003255 | 14.0% | −0.014450 | −0.011515 |
| 17.8% | −0.007051 | −0.004061 | 15.1% | −0.016635 | −0.013709 |
| 19.2% | −0.007915 | −0.004927 | 16.3% | −0.018976 | −0.016060 |
| 20.5% | −0.008835 | −0.005849 | 17.4% | −0.021468 | −0.018563 |
| 21.9% | −0.009812 | −0.006827 | 18.6% | −0.024108 | −0.021213 |
| 23.3% | −0.010842 | −0.007858 | 19.8% | −0.026893 | −0.024008 |
| 24.7% | −0.011924 | −0.008942 | 20.9% | −0.029817 | −0.026943 |
| 26.0% | −0.013057 | −0.010077 | 22.1% | −0.032877 | −0.030014 |
| 27.4% | −0.014238 | −0.011260 | 23.3% | −0.036070 | −0.033218 |
| 28.8% | −0.015467 | −0.012490 | 24.4% | −0.039391 | −0.036550 |
| 30.1% | −0.016740 | −0.013765 | 25.6% | −0.042836 | −0.040006 |
| 31.5% | −0.018055 | −0.015082 | 26.7% | −0.046403 | −0.043583 |
| 32.9% | −0.019411 | −0.016440 | 27.9% | −0.050087 | −0.047277 |
| 34.2% | −0.020806 | −0.017835 | 29.1% | −0.053884 | −0.051085 |
| 35.6% | −0.022236 | −0.019267 | 30.2% | −0.057791 | −0.055002 |
| 37.0% | −0.023700 | −0.020732 | 31.4% | −0.061805 | −0.059026 |
| 38.4% | −0.025195 | −0.022229 | 32.6% | −0.065921 | −0.063153 |
| 39.7% | −0.026718 | −0.023753 | 33.7% | −0.070137 | −0.067378 |
| 41.1% | −0.028268 | −0.025304 | 34.9% | −0.074450 | −0.071700 |
| 42.5% | −0.029841 | −0.026877 | 36.0% | −0.078855 | −0.076115 |
| 43.8% | −0.031434 | −0.028472 | 37.2% | −0.083349 | −0.080618 |
| 45.2% | −0.033045 | −0.030084 | 38.4% | −0.087930 | −0.085207 |
| 46.6% | −0.034671 | −0.031711 | 39.5% | −0.092593 | −0.089879 |
| 47.9% | −0.036310 | −0.033350 | 40.7% | −0.097335 | −0.094629 |
| 49.3% | −0.037958 | −0.034999 | 41.9% | −0.102153 | −0.099454 |
| 50.7% | −0.039613 | −0.036654 | 43.0% | −0.107042 | −0.104351 |
| 52.1% | −0.041272 | −0.038313 | 44.2% | −0.112000 | −0.109316 |

TABLE 4-continued

| Normalized Lens Ht | Min Sag 7 | Max Sag 7 | Normalized Lens Ht | Min Sag 8 | Max Sag 8 |
|---|---|---|---|---|---|
| 53.4% | −0.042932 | −0.039973 | 45.3% | −0.117021 | −0.114344 |
| 54.8% | −0.044591 | −0.041631 | 46.5% | −0.122103 | −0.119432 |
| 56.2% | −0.046245 | −0.043285 | 47.7% | −0.127241 | −0.124575 |
| 57.5% | −0.047893 | −0.044932 | 48.8% | −0.132429 | −0.129770 |
| 58.9% | −0.049531 | −0.046570 | 50.0% | −0.137665 | −0.135010 |
| 60.3% | −0.051158 | −0.048196 | 51.2% | −0.142942 | −0.140291 |
| 61.6% | −0.052771 | −0.049809 | 52.3% | −0.148255 | −0.145608 |
| 63.0% | −0.054368 | −0.051406 | 53.5% | −0.153599 | −0.150955 |
| 64.4% | −0.055949 | −0.052985 | 54.7% | −0.158969 | −0.156327 |
| 65.8% | −0.057510 | −0.054546 | 55.8% | −0.164357 | −0.161717 |
| 67.1% | −0.059052 | −0.056087 | 57.0% | −0.169757 | −0.167118 |
| 68.5% | −0.060574 | −0.057607 | 58.1% | −0.175163 | −0.172524 |
| 69.9% | −0.062074 | −0.059107 | 59.3% | −0.180568 | −0.177928 |
| 71.2% | −0.063555 | −0.060587 | 60.5% | −0.185963 | −0.183322 |
| 72.6% | −0.065016 | −0.062047 | 61.6% | −0.191342 | −0.188698 |
| 74.0% | −0.066459 | −0.063489 | 62.8% | −0.196695 | −0.194048 |
| 75.3% | −0.067885 | −0.064915 | 64.0% | −0.202015 | −0.199364 |
| 76.7% | −0.069298 | −0.066328 | 65.1% | −0.207293 | −0.204637 |
| 78.1% | −0.070702 | −0.067731 | 66.3% | −0.212519 | −0.209857 |
| 79.5% | −0.072101 | −0.069130 | 67.4% | −0.217684 | −0.215015 |
| 80.8% | −0.073500 | −0.070529 | 68.6% | −0.222779 | −0.220102 |
| 82.2% | −0.074906 | −0.071935 | 69.8% | −0.227794 | −0.225107 |
| 83.6% | −0.076326 | −0.073356 | 70.9% | −0.232719 | −0.230022 |
| 84.9% | −0.077770 | −0.074801 | 72.1% | −0.237544 | −0.234836 |
| 86.3% | −0.079247 | −0.076280 | 73.3% | −0.242260 | −0.239540 |
| 87.7% | −0.080769 | −0.077804 | 74.4% | −0.246856 | −0.244123 |
| 89.0% | −0.082348 | −0.079386 | 75.6% | −0.251322 | −0.248576 |
| 90.4% | −0.083999 | −0.081041 | 76.7% | −0.255650 | −0.252889 |
| 91.8% | −0.085737 | −0.082784 | 77.9% | −0.259830 | −0.257054 |
| 93.2% | −0.087580 | −0.084633 | 79.1% | −0.263853 | −0.261062 |
| 94.5% | −0.089546 | −0.086607 | 80.2% | −0.267712 | −0.264905 |
| 95.9% | −0.091656 | −0.088725 | 81.4% | −0.271399 | −0.268576 |
| 97.3% | −0.093930 | −0.091011 | 82.6% | −0.274908 | −0.272069 |
| 98.6% | −0.096393 | −0.093487 | 83.7% | −0.278233 | −0.275378 |
| 100.0% | −0.098763 | −0.095872 | 84.9% | −0.281370 | −0.278499 |
|  |  |  | 86.0% | −0.284317 | −0.281431 |
|  |  |  | 87.2% | −0.287071 | −0.284171 |
|  |  |  | 88.4% | −0.289634 | −0.286721 |
|  |  |  | 89.5% | −0.292008 | −0.289082 |
|  |  |  | 90.7% | −0.294197 | −0.291261 |
|  |  |  | 91.9% | −0.296210 | −0.293264 |
|  |  |  | 93.0% | −0.298055 | −0.295101 |
|  |  |  | 94.2% | −0.299746 | −0.296784 |
|  |  |  | 95.3% | −0.301298 | −0.298330 |
|  |  |  | 96.5% | −0.302731 | −0.299759 |
|  |  |  | 97.7% | −0.304067 | −0.301092 |
|  |  |  | 98.8% | −0.305335 | −0.302358 |
|  |  |  | 100.0% | −0.306217 | −0.303239 |

Table 5 contains sag data for fabricating lens element 6. The "Min Sag 9" and the "Max Sag 9" of the second and third columns are the minimum and maximum sag values of the object-side surface of lens element 3. Similarly, the "Min Sag 10" and the "Max Sag 10" of the fifth and sixth columns are the minimum and maximum sag values of the imaging-side surface of lens element 6. In an embodiment, the lens element 6 needs to be within the minimum and maximum sag values to ensure a given optical performance. Sag data in Table 5 is given in mm.

TABLE 5

| Normalized Lens Ht | Min Sag 9 | Max Sag 9 | Normalized Lens Ht | Min Sag 10 | Max Sag 10 |
|---|---|---|---|---|---|
| 0.0% | −0.003000 | 0.003000 | 0.0% | −0.003000 | 0.003000 |
| 0.7% | −0.002969 | 0.003031 | 0.7% | −0.002904 | 0.003095 |
| 1.5% | −0.002874 | 0.003125 | 1.4% | −0.002616 | 0.003380 |
| 2.2% | −0.002717 | 0.003281 | 2.1% | −0.002137 | 0.003853 |
| 2.9% | −0.002498 | 0.003500 | 2.7% | −0.001471 | 0.004512 |
| 3.7% | −0.002217 | 0.003780 | 3.4% | −0.000620 | 0.005354 |
| 4.4% | −0.001875 | 0.004121 | 4.1% | 0.000411 | 0.006374 |
| 5.1% | −0.001471 | 0.004523 | 4.8% | 0.001618 | 0.007569 |
| 5.9% | −0.001008 | 0.004985 | 5.5% | 0.002995 | 0.008933 |
| 6.6% | −0.000485 | 0.005506 | 6.2% | 0.004536 | 0.010459 |
| 7.4% | 0.000096 | 0.006085 | 6.8% | 0.006234 | 0.012143 |
| 8.1% | 0.000735 | 0.006722 | 7.5% | 0.008083 | 0.013976 |
| 8.8% | 0.001430 | 0.007414 | 8.2% | 0.010075 | 0.015952 |
| 9.6% | 0.002179 | 0.008161 | 8.9% | 0.012203 | 0.018064 |

TABLE 5-continued

| Normalized Lens Ht | Min Sag 9 | Max Sag 9 | Normalized Lens Ht | Min Sag 10 | Max Sag 10 |
|---|---|---|---|---|---|
| 10.3% | 0.002983 | 0.008962 | 9.6% | 0.014460 | 0.020306 |
| 11.0% | 0.003838 | 0.009815 | 10.3% | 0.016838 | 0.022669 |
| 11.8% | 0.004745 | 0.010719 | 11.0% | 0.019331 | 0.025146 |
| 12.5% | 0.005701 | 0.011672 | 11.6% | 0.021931 | 0.027732 |
| 13.2% | 0.006704 | 0.012673 | 12.3% | 0.024631 | 0.030417 |
| 14.0% | 0.007754 | 0.013720 | 13.0% | 0.027424 | 0.033197 |
| 14.7% | 0.008848 | 0.014811 | 13.7% | 0.030304 | 0.036064 |
| 15.4% | 0.009984 | 0.015944 | 14.4% | 0.033264 | 0.039012 |
| 16.2% | 0.011161 | 0.017118 | 15.1% | 0.036298 | 0.042035 |
| 16.9% | 0.012377 | 0.018332 | 15.8% | 0.039400 | 0.045126 |
| 17.6% | 0.013629 | 0.019582 | 16.4% | 0.042564 | 0.048281 |
| 18.4% | 0.014917 | 0.020866 | 17.1% | 0.045786 | 0.051493 |
| 19.1% | 0.016237 | 0.022184 | 17.8% | 0.049058 | 0.054757 |
| 19.9% | 0.017588 | 0.023533 | 18.5% | 0.052378 | 0.058069 |
| 20.6% | 0.018968 | 0.024911 | 19.2% | 0.055739 | 0.061423 |
| 21.3% | 0.020375 | 0.026315 | 19.9% | 0.059137 | 0.064815 |
| 22.1% | 0.021806 | 0.027745 | 20.5% | 0.062568 | 0.068241 |
| 22.8% | 0.023260 | 0.029197 | 21.2% | 0.066027 | 0.071695 |
| 23.5% | 0.024734 | 0.030669 | 21.9% | 0.069510 | 0.075175 |
| 24.3% | 0.026227 | 0.032160 | 22.6% | 0.073014 | 0.078675 |
| 25.0% | 0.027735 | 0.033667 | 23.3% | 0.076535 | 0.082194 |
| 25.7% | 0.029258 | 0.035189 | 24.0% | 0.080069 | 0.085725 |
| 26.5% | 0.030792 | 0.036723 | 24.7% | 0.083613 | 0.089268 |
| 27.2% | 0.032337 | 0.038266 | 25.3% | 0.087163 | 0.092817 |
| 27.9% | 0.033889 | 0.039818 | 26.0% | 0.090717 | 0.096370 |
| 28.7% | 0.035447 | 0.041376 | 26.7% | 0.094271 | 0.099924 |
| 29.4% | 0.037009 | 0.042937 | 27.4% | 0.097822 | 0.103476 |
| 30.1% | 0.038573 | 0.044500 | 28.1% | 0.101368 | 0.107023 |
| 30.9% | 0.040136 | 0.046064 | 28.8% | 0.104906 | 0.110563 |
| 31.6% | 0.041697 | 0.047625 | 29.5% | 0.108433 | 0.114092 |
| 32.4% | 0.043254 | 0.049183 | 30.1% | 0.111946 | 0.117608 |
| 33.1% | 0.044805 | 0.050734 | 30.8% | 0.115444 | 0.121109 |
| 33.8% | 0.046349 | 0.052279 | 31.5% | 0.118924 | 0.124592 |
| 34.6% | 0.047883 | 0.053814 | 32.2% | 0.122383 | 0.128055 |
| 35.3% | 0.049405 | 0.055338 | 32.9% | 0.125820 | 0.131496 |
| 36.0% | 0.050916 | 0.056849 | 33.6% | 0.129233 | 0.134913 |
| 36.8% | 0.052411 | 0.058346 | 34.2% | 0.132618 | 0.138303 |
| 37.5% | 0.053891 | 0.059827 | 34.9% | 0.135975 | 0.141665 |
| 38.2% | 0.055354 | 0.061292 | 35.6% | 0.139301 | 0.144997 |
| 39.0% | 0.056798 | 0.062738 | 36.3% | 0.142595 | 0.148296 |
| 39.7% | 0.058223 | 0.064163 | 37.0% | 0.145854 | 0.151561 |
| 40.4% | 0.059626 | 0.065568 | 37.7% | 0.149077 | 0.154790 |
| 41.2% | 0.061007 | 0.066951 | 38.4% | 0.152262 | 0.157981 |
| 41.9% | 0.062364 | 0.068311 | 39.0% | 0.155407 | 0.161134 |
| 42.6% | 0.063698 | 0.069646 | 39.7% | 0.158512 | 0.164245 |
| 43.4% | 0.065006 | 0.070956 | 40.4% | 0.161573 | 0.167313 |
| 44.1% | 0.066289 | 0.072241 | 41.1% | 0.164590 | 0.170338 |
| 44.9% | 0.067545 | 0.073499 | 41.8% | 0.167562 | 0.173316 |
| 45.6% | 0.068774 | 0.074730 | 42.5% | 0.170486 | 0.176248 |
| 46.3% | 0.069976 | 0.075934 | 43.2% | 0.173361 | 0.179130 |
| 47.1% | 0.071150 | 0.077110 | 43.8% | 0.176186 | 0.181963 |
| 47.8% | 0.072296 | 0.078258 | 44.5% | 0.178959 | 0.184744 |
| 48.5% | 0.073414 | 0.079378 | 45.2% | 0.181679 | 0.187472 |
| 49.3% | 0.074504 | 0.080469 | 45.9% | 0.184345 | 0.190146 |
| 50.0% | 0.075566 | 0.081533 | 46.6% | 0.186956 | 0.192765 |
| 50.7% | 0.076600 | 0.082569 | 47.3% | 0.189509 | 0.195326 |
| 51.5% | 0.077607 | 0.083577 | 47.9% | 0.192004 | 0.197829 |
| 52.2% | 0.078586 | 0.084559 | 48.6% | 0.194440 | 0.200273 |
| 52.9% | 0.079540 | 0.085514 | 49.3% | 0.196815 | 0.202656 |
| 53.7% | 0.080468 | 0.086443 | 50.0% | 0.199128 | 0.204977 |
| 54.4% | 0.081371 | 0.087348 | 50.7% | 0.201378 | 0.207235 |
| 55.1% | 0.082251 | 0.088228 | 51.4% | 0.203564 | 0.209429 |
| 55.9% | 0.083108 | 0.089087 | 52.1% | 0.205684 | 0.211557 |
| 56.6% | 0.083943 | 0.089923 | 52.7% | 0.207737 | 0.213618 |
| 57.4% | 0.084759 | 0.090739 | 53.4% | 0.209723 | 0.215611 |
| 58.1% | 0.085556 | 0.091537 | 54.1% | 0.211639 | 0.217536 |
| 58.8% | 0.086335 | 0.092318 | 54.8% | 0.213486 | 0.219389 |
| 59.6% | 0.087100 | 0.093083 | 55.5% | 0.215261 | 0.221172 |
| 60.3% | 0.087850 | 0.093834 | 56.2% | 0.216963 | 0.222881 |
| 61.0% | 0.088589 | 0.094573 | 56.8% | 0.218592 | 0.224517 |
| 61.8% | 0.089319 | 0.095303 | 57.5% | 0.220147 | 0.226079 |
| 62.5% | 0.090041 | 0.096025 | 58.2% | 0.221625 | 0.227564 |
| 63.2% | 0.090757 | 0.096742 | 58.9% | 0.223027 | 0.228972 |
| 64.0% | 0.091471 | 0.097455 | 59.6% | 0.224351 | 0.230302 |
| 64.7% | 0.092183 | 0.098168 | 60.3% | 0.225596 | 0.231553 |
| 65.4% | 0.092898 | 0.098882 | 61.0% | 0.226761 | 0.232724 |
| 66.2% | 0.093616 | 0.099601 | 61.6% | 0.227845 | 0.233813 |

TABLE 5-continued

| Normalized Lens Ht | Min Sag 9 | Max Sag 9 | Normalized Lens Ht | Min Sag 10 | Max Sag 10 |
|---|---|---|---|---|---|
| 66.9% | 0.094342 | 0.100326 | 62.3% | 0.228848 | 0.234820 |
| 67.6% | 0.095077 | 0.101060 | 63.0% | 0.229767 | 0.235744 |
| 68.4% | 0.095824 | 0.101807 | 63.7% | 0.230603 | 0.236584 |
| 69.1% | 0.096586 | 0.102568 | 64.4% | 0.231353 | 0.237338 |
| 69.9% | 0.097366 | 0.103347 | 65.1% | 0.232019 | 0.238007 |
| 70.6% | 0.098166 | 0.104146 | 65.8% | 0.232597 | 0.238589 |
| 71.3% | 0.098989 | 0.104968 | 66.4% | 0.233089 | 0.239083 |
| 72.1% | 0.099838 | 0.105816 | 67.1% | 0.233493 | 0.239489 |
| 72.8% | 0.100716 | 0.106692 | 67.8% | 0.233808 | 0.239806 |
| 73.5% | 0.101625 | 0.107599 | 68.5% | 0.234034 | 0.240033 |
| 74.3% | 0.102568 | 0.108540 | 69.2% | 0.234170 | 0.240169 |
| 75.0% | 0.103547 | 0.109518 | 69.9% | 0.234215 | 0.240215 |
| 75.7% | 0.104566 | 0.110534 | 70.5% | 0.234170 | 0.240170 |
| 76.5% | 0.105627 | 0.111592 | 71.2% | 0.234034 | 0.240033 |
| 77.2% | 0.106731 | 0.112694 | 71.9% | 0.233807 | 0.239804 |
| 77.9% | 0.107882 | 0.113841 | 72.6% | 0.233487 | 0.239483 |
| 78.7% | 0.109082 | 0.115037 | 73.3% | 0.233076 | 0.239070 |
| 79.4% | 0.110332 | 0.116283 | 74.0% | 0.232574 | 0.238565 |
| 80.1% | 0.111634 | 0.117582 | 74.7% | 0.231979 | 0.237967 |
| 80.9% | 0.112990 | 0.118934 | 75.3% | 0.231293 | 0.237277 |
| 81.6% | 0.114402 | 0.120341 | 76.0% | 0.230516 | 0.236495 |
| 82.4% | 0.115872 | 0.121806 | 76.7% | 0.229647 | 0.235622 |
| 83.1% | 0.117399 | 0.123328 | 77.4% | 0.228688 | 0.234658 |
| 83.8% | 0.118986 | 0.124909 | 78.1% | 0.227639 | 0.233604 |
| 84.6% | 0.120633 | 0.126551 | 78.8% | 0.226501 | 0.232459 |
| 85.3% | 0.122341 | 0.128252 | 79.5% | 0.225274 | 0.231226 |
| 86.0% | 0.124110 | 0.130015 | 80.1% | 0.223960 | 0.229905 |
| 86.8% | 0.125940 | 0.131839 | 80.8% | 0.222559 | 0.228497 |
| 87.5% | 0.127831 | 0.133723 | 81.5% | 0.221072 | 0.227002 |
| 88.2% | 0.129783 | 0.135669 | 82.2% | 0.219500 | 0.225423 |
| 89.0% | 0.131795 | 0.137674 | 82.9% | 0.217845 | 0.223760 |
| 89.7% | 0.133867 | 0.139739 | 83.6% | 0.216108 | 0.222015 |
| 90.4% | 0.135998 | 0.141863 | 84.2% | 0.214290 | 0.220188 |
| 91.2% | 0.138186 | 0.144044 | 84.9% | 0.212392 | 0.218282 |
| 91.9% | 0.140430 | 0.146281 | 85.6% | 0.210416 | 0.216297 |
| 92.6% | 0.142729 | 0.148574 | 86.3% | 0.208362 | 0.214235 |
| 93.4% | 0.145081 | 0.150919 | 87.0% | 0.206233 | 0.212097 |
| 94.1% | 0.147485 | 0.153316 | 87.7% | 0.204029 | 0.209884 |
| 94.9% | 0.149938 | 0.155762 | 88.4% | 0.201752 | 0.207597 |
| 95.6% | 0.152439 | 0.158257 | 89.0% | 0.199401 | 0.205237 |
| 96.3% | 0.154985 | 0.160797 | 89.7% | 0.196979 | 0.202804 |
| 97.1% | 0.157576 | 0.163382 | 90.4% | 0.194484 | 0.200300 |
| 97.8% | 0.160209 | 0.166008 | 91.1% | 0.191918 | 0.197724 |
| 98.5% | 0.162882 | 0.168676 | 91.8% | 0.189280 | 0.195075 |
| 99.3% | 0.165595 | 0.171383 | 92.5% | 0.186569 | 0.192354 |
| 100.0% | 0.167181 | 0.172966 | 93.2% | 0.183784 | 0.189557 |
| | | | 93.8% | 0.180923 | 0.186685 |
| | | | 94.5% | 0.177984 | 0.183733 |
| | | | 95.2% | 0.174963 | 0.180698 |
| | | | 95.9% | 0.171855 | 0.177577 |
| | | | 96.6% | 0.168656 | 0.174362 |
| | | | 97.3% | 0.165360 | 0.171047 |
| | | | 97.9% | 0.161957 | 0.167625 |
| | | | 98.6% | 0.158439 | 0.164086 |
| | | | 99.3% | 0.154795 | 0.160417 |
| | | | 100.0% | 0.154190 | 0.159809 |

In an embodiment, the ratio between the sag values at 75 percent point and at 25 percent point of the imaging-side surface of third lens element 5 satisfies the following condition:

$$5.0 < sag8(75)/sag8(25) < 7.0 \qquad (1)$$

where sag8(75) is the sag value at 75 percent point of the clear aperture of the imaging-side of the third lens element measured from the optical axis, and sag8(25) is the sag value at 25 percent point of the clear aperture of the imaging-side of the third lens element. In some embodiments, the ratio between the sag values at 75 percent point and at 25 percent point of the imaging-side surface of third lens element 5 in Equation (1) is preferably in a range from 5.5 to 6.5.

In an exemplary embodiment, the imaging-side surface of third lens element 5 has a sag at the 25 percent point from the optical axis of about 38 microns and a sag at the 75 percent point from the optical axis of about 245 microns. If the ratio in condition (1) exceeds the upper limit, the optical power of the third lens element and the lens system 300 may be reduced. If the ratio in condition (1) is smaller than the lower limit, the compactness of the lens system 200 (FIG. 2) may be affected.

Figure 4:
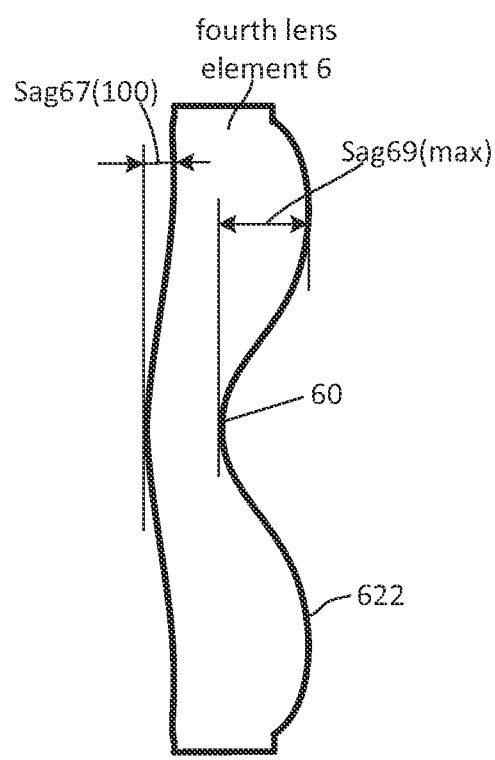
FIG. 4 is a cross-sectional view of a lens element to define sag values.

Additionally, the object-side surface of fourth lens element 6 has a sag value at 100 percent point satisfying the following condition:

$$sag9(100) > 167 \text{ microns} \qquad (2)$$

where sag9(100) is the sag value at 100 percent point of the clear aperture measured from the optical axis of the object-side surface of the fourth lens element (see Table 5 and FIG. 4).

Furthermore, the imaging-side surface of fourth lens element 6 provides the largest sag value at a certain percentage point of the effective radius. In an embodiment, the largest sag value is 235 microns at 75 percentage point of the efficient radius of the fourth lens element. That is, the imaging-side surface of the fourth lens element satisfies the following condition:

$$sag10(max) > 235 \text{ microns} \tag{3}$$

where sag10(max) denotes the highest sag value of the imaging-side surface of the fourth lens element.

If the imaging-side surface of the fourth lens element does not meet the condition (3), the lens system 200 of FIG. 2 may have astigmatism and aberration that exceeds the target design specifications. In some embodiments, the conditions (1), (2) and (3) allow the system to be constructed with a target total track length.

In an embodiment, first, second, third and fourth lens elements can be made of plastic or glass and have an Abbe number of about 56, 23, 56, and 56, respectively. In an embodiment, the lens system 200 satisfies the following design characteristics and conditions:

$$vd1 - vd2 > 30; \tag{4}$$

$$0.5 < d1avg/d2avg < 0.9; \tag{5}$$

$$0.4 < d3avg/d4avg < 0.7 \tag{6}$$

wherein vd1, vd2 are the respective Abbe number of the first and second lens elements, and d1avg, d2avg, d3avg, and d4avg are the respective average diameters of the first, second, third, and fourth lens elements. The average diameter is the sum of the object-side and imaging-side diameters of a lens element, divided by two.

In order to obtain a high-performance lens system which is suitable ofr mega-pixels imaging sensors, the range in Equation (6) may be narrower such as 0.45<d3avg/d4avg<0.65, or preferably 0.50<d3avg/d4avg<0.60.

Air gaps between the lens elements and optical filter may minimize aberrations. In a preferred embodiment, the ratio between the sum of all air gaps from the imaging-side surface of the first lens element to the object-side surface of the optical filter and the total track length (TTL) is less than 0.4 in order for the lens system to be able to focus from infinity to portrait distances. In order words, the lens system 200 satisfies the following condition:

$$(\Sigma(\text{air gaps}))/TTL < 0.4 \tag{7}$$

where Σ(air gaps) is the sum of all air gaps from the imaging-side surface of the first lens element to the object-side surface of the optical filter and TTL is the total track length of the lens system. In some embodiments, the upper limit in Equation (7) may be smaller such as less than 0.35 or preferably than 0.3 to obtain a compacter design of the lens system.

Similarly, air gaps between the lens elements may minimize aberrations. In some embodiments, the ratio between the sum of all air gaps between lens elements and the total track length (TTL) is less than 0.25 in order for the lens system to be able to focus from infinity to portrait distances. In a preferred embodiment, the sum of the air gaps from the imaging-side surface of the first lens element to the object-side surface of the fourth lens element is about 0.5 mm. The ratio of the sum of the air gaps between the lens elements to the total track length is about 0.25 or less, or preferably about 0.2 or less.

The relative positions of the lens elements to each other contribute to good optical performance. In some embodiments, the air gaps satisfy the following inequities:

$$0 < s1/s2 < 0.4 \tag{8}$$

$$0 < s3/s4 < 0.2 \tag{9}$$

wherein s1 is the air gap between the imaging-side surface of first lens element 3 and the object-side surface of second lens element 4, s2 is the air gap between the imaging-side surface of second lens element 4 and the object-side surface of third lens element 5, s3 is the air gap between the imaging-side surface of third lens element 5 and the object-side surface of fourth lens element 6, and s4 is the air gap between the imaging-side surface of fourth lens element 6 and the object-side surface of optical filter 7, as shown in FIG. 3.

Further, the average diameter of each of the lens elements is related to its thickness as follows:

$$2 < d1avg/t1 < 3; \tag{10}$$

$$4 < d2avg/t2 < 6 \tag{11}$$

$$3 < d3avg/t3 < 4 \tag{12}$$

$$8 < d4avg/t4 < 10 \tag{13}$$

wherein t1, t2, t3, and t4 are the respective thickness of the first, second, third, and fourth lens elements, and d1avg, d2avg, d3avg, and d4avg are the respective average diameters of the first, second, third, and fourth lens elements. (As noted above, the average diameter is the sum of the object-side diameter and the imaging-side diameter of a lens element, divided by two.)

Figure 5:
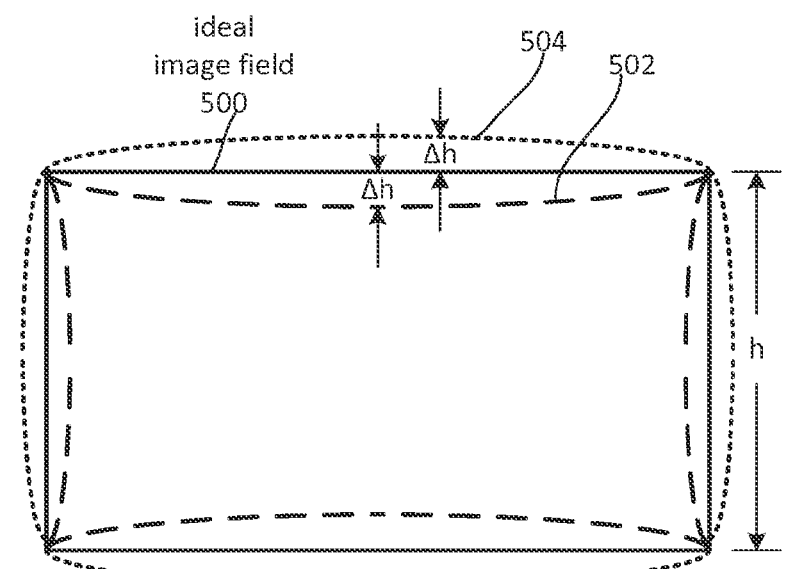
FIG. 5 is a schematic diagram illustrating TV distortion of an imaging lens system.

FIG. 5 is a schematic diagram illustrating TV distortion of an imaging lens system. TV distortion causes deviation from an ideal rectangular image field 500, which can occur as an inward distortion 502 or outward distortion 504. A TV distortion can be expressed with the following equation:

$$TV \text{ distortion} = \Delta h/h \tag{16}$$

In some embodiments, an imaging lens system as described herein may have performance of astigmatism and distortion aberrations that meet certain target characteristics. Images taken with an imaging lens system disclosed above can be viewed on a TV screen with a TV distortion of less than 1 percent.

Figure 6:
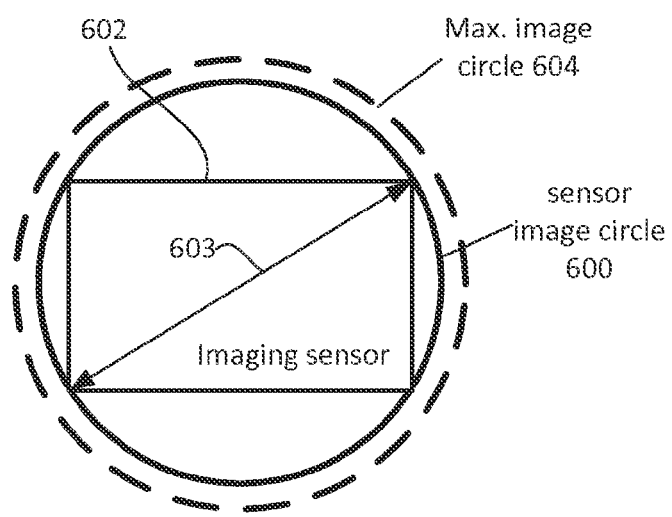
FIG. 6 is a schematic diagram illustrating a relationship between an imaging sensor, an associated image sensor circle and a maximum image circle according to an embodiment of the present invention.

FIG. 6 shows a relation between a semiconductor imaging sensor (e.g., a CMOS imaging sensor), the associated sensor image circle and the maximum image circle according to an embodiment of the present invention. The sensor image circle (SIC) can be defined as a circle 600 that circumscribes a rectangular imaging sensor 602. In other words, the diameter of sensor image circle is equal to a diagonal size 603 of the rectangular imaging sensor. The maximum image circle for a lens system can be defined as a circle 604 that corresponds to a circular area in the imaging plane over which the lens produces acceptable image quality. In some embodiments, the ratio between the sensor image circle and the maximum image circle is greater than 0.9. For example, the imaging sensor may have a diagonal of about 3.22 mm, so that the sensor image circle also has a diameter of 3.22 mm, and the maximum image circle has a diameter of 3.44 mm. In an embodiment, the lens system has a chief ray angle of less than 28° and a relative illumination at full field diagonal image height greater than 40 percent. Embodiments of the present invention provide a compact lens system according to the following inequity:

$$DM/TTL \geq 1.0 \tag{17}$$

where DM is the diameter of the sensor image circle and TTL is the total track length. For example, the sensor image circle can have a diameter of 3.22 mm and the total track length can be 3.10 mm in one embodiment.

In some embodiments, illumination of the surface area of the imaging sensor may depend on performance characteristics of an associated lens system. In general, an optical lens system may not illuminate the imaging sensor uniformly even when a uniform illuminating light is applied to it. A lens system may only partially pass through light that irradiates the lens system at a certain angle of incidence. The lens system may completely pass light that is substantially normal to the optical axis. As a result, the imaging sensor may receive more light in the center than around the edges. Therefore, a relative illumination may be used to characterize the optical performance of a lens system. The relative illumination can be defined as a percentage of a maximum illumination value. If the maximum illumination value of a surface region (e.g., the center) of the imaging sensor is 1.0 or 100%, the relative illumination values may decrease when moving away from the center of the imaging sensor. In an embodiment, the lens system 200 or 300 as shown in FIG. 2 or 3 may provide a relative illumination value greater than 40.0 percent across the diagonal of the imaging sensor.

While the invention has been described with respect to specific embodiments, one skilled in the art will recognize that variations and modifications are possible and that the invention is intended to cover all modifications and equivalents within the scope of the following claims.

What is claimed is:

1. An imaging lens comprising first, second, third, and fourth lens elements arranged in order from an object side to an imaging side, each of the first, second, third, and fourth lens elements having an object-side surface facing toward the object side, and an imaging-side surface facing toward the imaging side, wherein the imaging lens satisfies the conditions of:

$$30 < vd1 - vd2;$$

$$0.5 < d1\text{avg}/d2\text{avg} < 0.9; \text{ and}$$

$$0.4 < d3\text{avg}/d4\text{avg} < 0.7,$$

wherein vd1 and vd2 are Abbe numbers of the respective first and second lens elements, and d1avg, d2avg, d3avg, and d4avg are average diameters of the first, second, third, and fourth lens elements, respectively; and wherein the imaging-side surface of the third lens element satisfies the following condition:

$$5.0 < sag75/sag25 < 7.0,$$

wherein sag25 is a sag value at a 25 percent point of a clear aperture of the imaging-side surface of the third lens element and sag75 is a sag value at a 75 percent point of the clear aperture of the imaging-side surface of the third lens element.

2. The imaging lens of claim 1, wherein the first lens element has a ratio of average diameter to thickness in a range from 2 to 3.

3. The imaging lens of claim 1, wherein the second lens element has a ratio of average diameter to thickness in a range from 4 to 6.

4. The imaging lens of claim 1, wherein the third lens element has a ratio of average diameter to thickness in a range from 3 to 4.

5. The imaging lens of claim 1, wherein the fourth lens element has a ratio of average diameter to thickness in a range from 8 to 10.

6. The imaging lens of claim 1, wherein the object-side surface and the imaging-side surface of the first, second, third, and fourth lens elements are coated with an anti-reflective coating.

7. The imaging lens of claim 1, further comprising an optical filter disposed between the fourth lens element and an imaging sensor plane and configured to suppress transmission of infrared light.

8. The imaging lens of claim 7, wherein the optical filter has a thickness about 0.3 mm.

9. The imaging lens of claim 1, wherein the first, second, third, and fourth lens elements have air gaps therebetween and a ratio of a total air gap to a total track length is about 0.25 or less.

10. The imaging lens of claim 1, wherein the object-side diameter of each lens element is equal to or smaller than the imaging-side diameter of that lens element.

11. The imaging lens of claim 7, wherein the imaging lens further satisfies the following conditions:

$$0 < s1/s2 < 0.4; \text{ and}$$

$$0 < s3/s4 < 0.2,$$

wherein s1 is an air gap between the imaging-side surface of the first lens element and the object-side surface of the second lens element, s2 is an air gap between the imaging-side surface of the second lens element and the object-side surface of the third lens element, s3 is an air gap between the imaging-side surface of the third lens element and the object-side surface of the fourth lens element, and s4 is an air gap between the imaging-side surface of the fourth lens element and the object-side surface of the optical filter.

12. The imaging lens of claim 1, wherein a sag value at a 100 percent point of the clear aperture of the imaging-side surface of the third lens element is equal to or greater than 300 microns.

13. The imaging lens of claim 1, wherein the imaging-side surface of the fourth lens element has a maximum sag in a range from 235 microns to 240 microns at the proximity of a 75 percent point in relation to the optical axis.

14. The imaging lens of claim 1, wherein the imaging lens has a maximum chief ray angle (CRA) smaller than 28°.

15. The imaging lens of claim 1, wherein the imaging lens has a TV distortion smaller than 1.0 percent.

16. The imaging lens of claim 1, wherein the imaging lens has a sensor image circle of about 3.2 mm.

17. The imaging lens of claim 1, wherein the first lens element has a ratio of average diameter to thickness in a range from 2 to 3.

18. The imaging lens of claim 1, wherein the second lens element has a ratio of average diameter to thickness along an optical axis in a range from 4 to 6.

19. The imaging lens of claim 1, wherein the third lens element has a ratio of average diameter to thickness along an optical axis in a range from 3 to 4.

20. The imaging lens of claim 1, wherein the fourth lens element has a ratio of average diameter to thickness along an optical axis in a range from 8 to 10.

21. The imaging lens of claim 1, wherein the imaging lens further satisfies the following condition:

$$DM/TTL \geq 1.0,$$

wherein DM is a diameter of a sensor image circle and TTL is a total track length.

22. The imaging lens of claim 1, wherein the imaging lens provides a relative illumination greater than 40.0 percent across a full diagonal size of an imaging sensor area.

23. The imaging lens of claim 7, wherein the imaging sensor plane is at a distance between about 0.3 mm and 0.4 mm from the optical filter.

* * * * *